United States Patent [19]

Wang

[11] 3,891,801

[45] June 24, 1975

[54] FOUR-WAY FOUR-WIRE ACTIVE BRIDGE

[75] Inventor: Kuei-Seng Wang, Flemington, N.J.

[73] Assignee: Quindar Electronics, Inc., Springfield, N.J.

[22] Filed: Jan. 21, 1974

[21] Appl. No.: 434,938

[52] U.S. Cl. .......................... 179/1 CN; 179/170 D

[51] Int. Cl. ............................................ H04m 3/56

[58] Field of Search ......... 179/1 CN, 170 R, 170 D, 179/170 T, 170 NC; 333/11

[56] References Cited

UNITED STATES PATENTS

| | | | |
|---|---|---|---|
| 1,832,452 | 11/1931 | Feldtkeller et al. | 197/170 D |
| 1,944,283 | 1/1934 | Strecker | 179/1 CN |
| 2,019,603 | 11/1935 | Green | 333/11 |
| 2,035,536 | 3/1936 | Cowan et al. | 179/170 D |

*Primary Examiner*—Kathleen Claffy
*Assistant Examiner*—Randall P. Myers
*Attorney, Agent, or Firm*—Morse, Altman, Oates & Bello

[57] ABSTRACT

An active four-way four-wire bridge for interconnecting audio communication network branches comprises distribution amplifiers for receiving input signals and summing amplifiers for transmitting the received signals. The bridge is characterized by four ports, each port having a receiving section and a transmitting section, a distribution and summing amplifier set defining one port. The distribution amplifier of one port is connected to the summing amplifiers of the other three ports, the distribution amplifier and summing amplifier of the same port being isolated from each other. An input signal received at the receiving section of one port is applied to the transmitting section of all ports other than the transmitting section of the receiving port.

11 Claims, 2 Drawing Figures

FOUR-WAY FOUR-WIRE ACTIVE BRIDGE

BACKGROUND OF THE INVENTION

1. Field of Invention

The present invention relates to communication networks, and more particularly, is directed towards an active four-way fourwire bridge for connecting branches of communication networks.

2. Description of the Prior Art

In most audio communication networks, several branches of the networks are interconnected at various junction points. If impedance matching for optimum power transfer and isolation of receive and transmit paths are not required, all branches are tied directly together. However, in order to provide impedance matching and isolation, a bridge notwork is required. In most cases, the bridge is a passive resistive bridge characterized by four ports, each port having a transmitting section and a receiving section. Passive resistive bridges suffer from the disadvantage of high power loss and limited isolation among the branches. Such bridges suffer also from the disadvantage that they are sensitive to the characteristic impedance of the line and network changes in the circuit. Satisfactory operation of these bridges depends upon accurate impedance matching and therefore presents a costly maintainance problem for the users.

SUMMARY OF THE INVENTION

It is an object of the present invention to provide an active four-way four-wire bridge particularly for interconnecting branches of communication networks which does not suffer from the heretofore mentioned disadvantages. The present invention is characterized by an active four port bridge comprising interconnected distribution and summing amplifiers, each port having a receiving section and a transmitting section. The transmitting section of each port includes a summing amplifier and the receiving section of each port includes a distribution amplifier, a distribution and summing amplifier set defining one port. An input signal received at a receiving section of the one port is applied to the transmitting section of all ports other than the receiving port, isolation being provided between the receiving section and the transmitting section of the same port. The combination of interconnected summing and distribution amplifiers is such as to provide an active four-way four-wire bridge whose performance is independent of line impedance.

Other objects, features and advantages of the present invention will become more apparent after considering the following detailed disclosure.

The invention accordingly comprises the device possessing the construction, combination of elements and arrangement of parts that are exemplified in the following detailed disclosure, the scope of which will be indicated in the appended claims.

BRIEF DESCRIPTION OF THE DRAWINGS

For a fuller understanding of the nature and objects of the present invention reference should be had to the following detailed description taken in connection with the accompanying drawings wherein.

DETAILED DESCRIPTION OF THE PREFERRED EMBODIMENT

Figure 1:
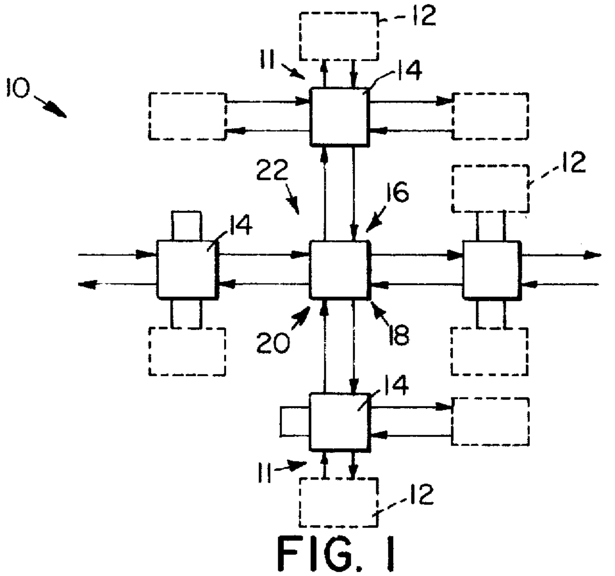
FIG. 1 is a block and schematic diagram of a communication network having branches interconnected by means of a four-way four-wire bridge made in accordance with the present invention.

Referring now to the drawings, particularly FIG. 1, there is shown a communication network 10 having a plurality of branches 11 through which received and transmitted signals are directed, branches 11 interconnecting communication devices 12. In order to provide impedance matching for optimum power transfer and isolation of receive and transmit paths, an active four-way four-wire bridge 14 is provided for interconnecting devices 12. Each bridge 14 includes four ports denoted by the reference characters 16, 18, 20 and 22.

Figure 2:
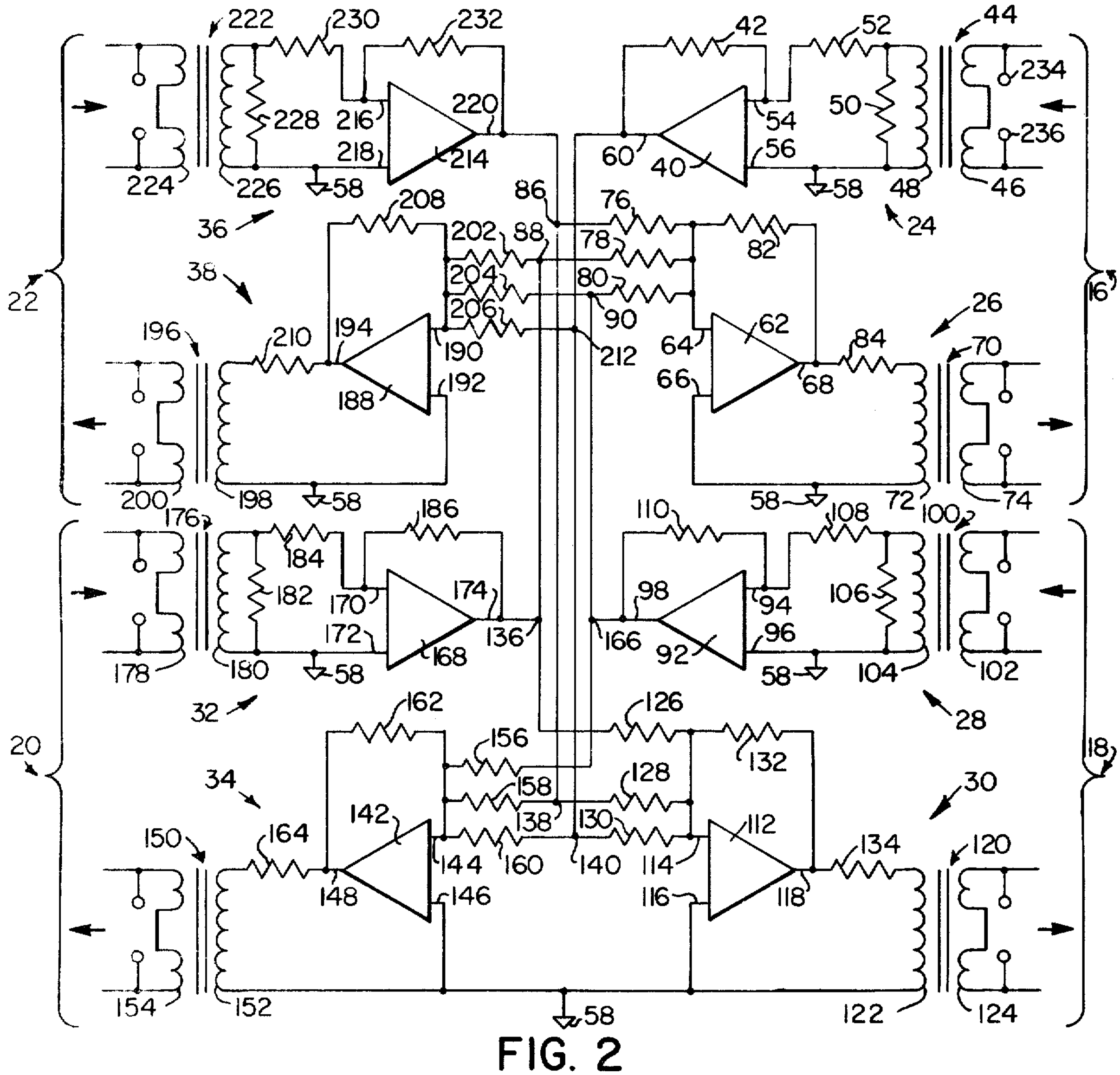
FIG. 2 is a detailed schematic diagram of the four-way four-wire bridge of FIG. 1.

As best shown in FIG. 2, port 16 includes a receiving section 24 and a transmitting section 26; port 18 includes a receiving section 28 and a transmitting section 30; port 20 includes a receiving section 32 and a transmitting section 34; and port 22 includes a receiving section 36 and a transmitting section 38. In the described embodiment, each receiving section and each transmitting section includes an operational amplifier. The operational amplifier of each receiving section of any one port defines a distribution amplifier which equally distributes an input signal applied to that port to the transmitting amplifiers in the other ports, the operational amplifier of each transmitting section of any one port defines a summing amplifier which sums the signal from the receiving amplifiers in the other ports, one input receiving section and one output transmitting section representing one port of bridge 14. Accordingly, bridge 14 is an active four-way four-wire bridge.

Receiving section 24 of port 16 includes a distribution amplifier 40 having a feedback network of resistors 42 and 52 which defines the forward amplification gain, a transformer 44 having windings 46 and 48, and a terminating resistor 50 which defines the input impedance. Resistor 50 is connected across winding 48 and resistor 52 is serially connected between an input terminal 54 of distribution amplifier 40 and one side of resistor 50, the other side of resistor 50 being connected to an input terminal 56 of distribution amplifier 40 and a return 58, for example a signal ground. Feedback resistor 42 is connected between an output terminal 60 and input terminal 54 of distribution amplifier 40. As hereinafter noted, an output signal at terminal 60 is distributed to transmitting amplifiers 188, 142 and 112 through resistors 206, 160, and 130, respectively. Transmitting section 26 of port 16 includes a summing amplifier 62 having input terminals 64, 66 and an output terminal 68, a transformer 70 having windings 72 and 74, and resistors 76, 78, 80, 82 and 84. Resistor 82 is a feedback resistor connected between output terminal 68 and input terminal 64. Resistor 84 is serially connected between output terminal 68 and one side of winding 72, the other side of winding 72 being connected to input terminal 62 and return 58. Resistor 76 is connected between a junction 86 and input terminal 64, resistor 78 is connected between a junction 88 and input terminal 64, and resistor 80 is connected between a junction 90 and input terminal 64.

Receiving section 28 of port 18 comprises a distribution amplifier 92 having input terminals 94, 96 and an output terminal 98, a transformer 100 having windings 102 and 104, and resistors 106, 108, and 110. Resistors 108 and 110 are in a feedback network which defines the forward amplification gain and resistor 106 is a terminating resistor which defines the input impedance. Resistor 106 is connected across winding 104 and resistor 108 is serially connected between input terminal 94 and one side of resistor 106, the other side of resistor 106 being connected to input terminal 96 and return 58. Resistor 110 is connected between output terminal 98 and input terminal 94. Transmitting section 30 of port 18 comprises a summing amplifier 112 having input terminals 114, 116 and an output terminal 118, a transformer 120 having windings 122, and 124, and resistors 126, 128, 130, 132, and 134. Resistor 132 is a feedback resistor connected between output terminal 118 and input terminal 114. Resistor 134 is serially connected between output terminal 118 and one side of winding 122, the other side of winding 122 being connected to input terminal 116 and return 58. Resistor 126 is connected between input terminal 114 and a junction 136 which is further connected to junction 88. Resistor 128 is connected between input terminal 114 and a junction 138 which is further connected to junction 86. Resistor 130 is connnected between a junction 140 and input terminal 114.

Transmitting section 34 of port 20 comprises a summing amplifier 142 having input terminals 144, 146 and an output terminal 148, a transformer 150 having windings 152 and 154, and resistors 156, 158, 160, 162, and 164. Resistor 162 is a feedback resistor serially connected between output terminal 148 and input terminal 144. Resistor 164 is serially connected between output terminal 148 and one side of winding 152, the other side of winding 152 being connected between input terminal 144 and a junction 166 which is further connected to junction 90 and output terminal 98 of distribution amplifier 92. Resistor 158 is connected between input terminal 144 and junction 138. Resistor 160 is connected between input terminal 144 and junction 140. Receiving section 32 of port 20 comprises a distribution amplifier 168 having input terminals 170, 172 and an output terminal 174, a transformer 176 having windings 178 and 180, and resistors 182, 184 and 186. Resistors 184 and 186 are in feedback network which defines the forward amplification gain and resistor 182 is a terminating resistor which defines the input impedance. Resistor 182 is connected across winding 180. Resistor 184 is serially connected between input terminal 170 and one side of resistor 182, the other side of resistor 182 being connected to input terminal 172 and a return 58. Resistor 186 is connected between output terminal 174 and input terminal 176. Output terminal 174 is connected to junction 136 which is further connected to junction 88.

Transmitting section 38 of port 22 comprises a summing amplifier 188 having input terminals 190, 192 and an output terminal 194, a transformer 196 having windings 198 and 200, and resistors 202, 204, 206, 208, and 210. Resistor 208 is a feedback resistor serially connected between output terminal 194 and input terminal 190. Resistor 210 is serially connected between one side of winding 198 and output terminal 194, the other side of winding 198 being connected to input terminal 192 and return 58. Resistor 202 is connected between input terminal 190 and junction 88 which is further connected to junction 136. Resistor 204 is connected between input terminal 190 and junction 90 which is further connected to junction 166. Resistor 206 is connected between input terminal 190 and a junction 212 which is further connected to output terminal 60 of distribution amplifier 40 and junction 140. Receiving section 36 of port 22 comprises a distribution amplifier 214 having input terminals 216, 218 and an output terminal 220, a transformer 222 having windings 224 and 226, and resistors 228, 230, and 232. resistors 230 and 232 are in a feedback network which defines the forward amplification gain and resistor 228 is a terminating resistor which defines the input impedance. Resistor 228 is connected across winding 226. Resistor 230 is connected between input terminal 216 and one side of resistor 228, the other side of resistor 228 being connected to input terminal 218 and return 58. Resistor 232 is connected between output terminal 220 and input terminal 216. Output terminal 220 is connected to junction 86 which is further connected to junction 138.

From the foregoing it will be readily appreciated that an incoming signal applied to the receiving section of any one port is applied to the transmitting section of all other ports and is not applied to the transmitting section of its own port. That is, a signal received at port 16 is coupled through transformer 44 and fed to distribution amplifier 40. The signal at output terminal 60 of distribution amplifier 40 is applied to transmitting sections 30, 34, and 38 of ports 18, 20, and 22, respectively. Output terminal 60 is connected to summing amplifier 112 via resistor 130, summing amplifier 142 via resistor 160, and summing amplifier 188 via resistor 206. An output signal related to the input signal received at port 16 is presented at windings 124, 154, and 200 of transformers 120, 150, and 196, respectively. An incoming signal received at port 18 is coupled through transformer 100 and fed to distribution amplifier 92. The signal at the output of distribution amplifier 92 is fed to summing amplifiers 62, 142, and 188. An output signal related to the input signal received at port 18 is presented at windings 74, 154, and 200 of transformers 70, 150, and 196, respectively. An incoming signal received port 20 is coupled through transformer 176 and applied to distribution amplifier 168. The signal at the output of distribution amplifier 168 is fed to summing amplifiers 62, 112, and 188. An output signal related to the input signal received at port 20 is presented at windings 74, 124, and 200 of transformers 70, 120, and 196, respectively. An incoming signal received at port 22 is coupled through transformer 222 and applied to distribution amplifier 214. The signal at the output of distribution amplifier 214 is fed to summing amplifiers 62, 112, and 142. An output signal related to the input signal received at port 22 is presented at windings 74, 124, and 154 of transformers 70, 120, and 150, respectively.

The voltage gain from an input port (receiving section) to an output port (transmitting section) is controlled by appropriate selection of the resistance value of the resistors associated with the amplifiers of the corresponding ports. It will be readily appreciated that various voltage gain configurations are possible. For example, in one embodiment of bridge 14 there is provided 0db gain from port to port. In a second embodiment, bridge 14 is characterized by positive voltage gain between three input ports and three output ports and 0db gain between one input port and three output ports. In a third embodiment there is provided positive voltage gain between two input ports and two output ports and 0db gain between two input ports and two output ports. In a fourth embodiment, bridge 14 is characterized by positive voltage gain from port to port. In practice, positive voltage gain of up to 30db is readily provided by bridge 14. In the preferred embodiment, each of the transformers are isolation transformers providing 600 ohm impedance at the input of the receiving sections and at the output of the transmitting sections.

In the illustrative embodiment, receiving sections 24, 28 32 and 36 are similar in operation and construction and transmitting sections 26, 30, 34 and 38 are similar in operation and construction. The incoming signal applied to any one port appears at equal levels at all transmitting sections of the other ports and not at the transmitting section of the receiving port. Each receiving section and transmitting section is provided with a pair of terminals 234, 236 which are provided to short circuit any unused ports in order to eliminate noise pick up, the distribution amplifiers operating as buffers so that the unused port can be shorted out without changing the operational performance of the bridge. The arrangement of summing amplifiers and distribution amplifiers is such as to provide approximately 70 db isolation between the transmitting section and receiving section of any one port.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. An active four port bridge comprising:

a. first, second, third, and fourth distribution amplifier means, each of said distribution amplifier means adapted to receive an input signal; and b. first, second, third and fourth summing amplifier means, each of said summing amplifier means adapted to transmit an output signal related to said input signal, one of said distribution amplifier means and one of said summing amplifier means coupled to each port for transmitting and receiving signals;

c. said first distribution amplifier means connected only to said second, third, and fourth summing amplifier means;

d. said second distribution amplifier means connected only to said first, third, and fourth summing amplifier means;

e. said third distribution amplifier means connected only to said first, second and fourth summing amplifier means;

f. said fourth distribution amplifier means connected only to said first, second, and third summing amplifier means;

g. said first summing amplifier means operative to sum signals from said second, third and fourth distribution amplifier means, said second summing amplifier means operative to sum signals from said first, third and fourth distribution amplifier means, said third summing amplifier means operative to sum signals from said first, second and fourth distribution amplifier means, said fourth summing amplifier means operative to sum signals from said first, second and third distribution amplifier means;

h. said input signal applied to one of said distribution amplifier means is fed only to said summing amplifier means operatively connected to said distribution amplifier means to which said input signal is applied.

2. The active bridge as claimed in claim 1 wherein said first distribution amplifier means and said first summing amplifier means define first port means, said second distribution amplifier means and said second summing amplifier means define second port means, said third distribution amplifier means and said third summing amplifier means define third port means, and said fourth distribution amplifier means and said fourth distribution amplifier means define fourth port means, said distribution amplifier means and said summing amplifier means of each said port means being electrically isolated from each other, said input signal received at one of said ports is applied only to the other ones of said ports.

3. The active bridge as claimed in claim 1 wherein each of said distribution amplifier means includes a differential input operational amplifier having first and second input terminals and an output terminal.

4. The active bridge as claimed in claim 3 including first, second, third, and fourth transformer means, each of said transformer means having first and second windings, said first winding of said first tranformer means connected between said first and second input terminals of said first distribution amplifier means, an input signal applied to said second winding of said first transformer means coupled to said first distribution amplifier means through said first winding of said first transformer means, said first winding of said second transformer means connected between said first and second input terminals of said second distribution amplifier means, an input signal applied to said second winding of said second transformer means coupled to said second distribution amplifier means through said first winding of said second transformer means, said first winding of said third transformer means connected between said first and second input terminals of said third distribution amplifier means, an input signal applied to said second winding of said third transfromer means coupled to said third distribution amplifier means through said first winding of said third transformer means, and said first winding of said fourth transformer means connected between said first and second input terminals of said fourth distribution amplifier means, an input signal applied to said second winding of said fourth transformer means coupled to said fourth distribution amplifier means through said first winding of said fourth transformer means, a terminating resistor defining an input impedance being connected across said first winding of each said transformer means.

5. The active bridge as claimed in claim 1 wherein each of said summing amplifier means includes a differential input operational amplifier having first and second input terminals and an output terminal.

6. The active bridge as claimed in claim 5 including first, second, third, and fourth transformer means, each of said transformer means having first and second windings, said first winding of said first transformer means is connected between said second input terminal and said output terminal of said first summing amplifier means, a signal at said output terminal of said first summing amplifier means is applied to said first winding of said first transformer means and is coupled to said second winding of said first transformer means, said first winding of said second transformer means is connected between said second input terminal and said output terminal of said second summing amplifier means, a signal at said output terminal of said second summing amplifier means is applied to said first winding of said second transformer means and is coupled to said second winding of said second transformer means, said first winding of said third transformer means is connected between said second input terminal and said output terminal of said third summing amplifier means, a signal at said output terminal of said third summing amplifier means is applied to said first winding of said third transformer means and is coupled to said second winding of said third transformer means, said first winding of said fourth transfromer menas is connected between said second input terminal and said output terminal of said fourth summing amplifier means, a signal at said output terminal of said fourth summing amplifier means is applied to said first winding of said fourth transformer means and is coupled to said second winding of said fourth transformer means.

7. An active four port bridge comprising:

a. first port means including input means for receiving a signal and output means for summing and for transmitting a signal, said first port means input means electrically isolated from said first port means output means;

b. second port means including input means for receiving a signal and output means for summing and for transmitting a signal, said second port means input means electically isoloated from said second port means output means;

c. third port means including input means for receiving a signal and output means for summing and for transmitting a signal, said third port means input means electically isolated from said third port means output means; and d. fourth port means including input means for receiving a signal and output means for summing and for transmitting a signal, said fourth port means input means electrically isolated from said fourth port means output means;

e. said first port means input means connected only to said second, third, and fourth port means outport means;

f. said second port input means connected only to said first, third, and fourth port means output means;

g. said third port means input means connectedd only to said first, second, and fourth port means output means;

h. said fourth port means input means connected only to said first, second, and third port means output means;

i. a signal received at said first port means input means is applied to said second, third, and fourth port means output means, said signal at said second, third, and fourth port means output means from said first port means input means having a magnitude at least equal to the magnitude of said signal received at said first port means input means;

j. a signal received at said second port means input means is applied to said first, third and fourth port means output means, said signal at said first; third, and fourth port means output means from said second port means input means having a magnitude at least equal to the magnitude of said signal received at said second port means input means;

k. a signal received at said third port means imput means is applied to said first, second and fourth port means output means, said signal at said first, second, and fourth port means output means from said third port means input means having a magnitude at least equal to the magnitude of said signal received at said third port means input means;

l. a signal received at said fourth port means input means is applied to said first, second, and third port means output means, said signal at said first, second, and third port means output means from said fourth port means input means having a magnitude at least equal to the magnitude of said signal received at said fourth port means input means;

m. said first port means output means operative to sum signals from said second, third and fourth port means input means, said second port means output means operative to sum signals from said first, third and fourth port means input means, said third port means output means operative to sum signals from said first, second and fourth port means input means, said fourth port means output means operative to sum signals from said first, second and third port means input means.

8. The active bridge as claimed in claim 7 wherein each said input means includes distribution amplifier means, each said distribution amplifier means having first and second input terminals and an output terminal.

9. The active bridge as claimed in claim 8 including first, second, third, and fourth transformer means, each of said transformer means having first and second windings, said first winding of said first transformer means connected between said first and second input terminals of said distribution amplifier means of said first port means input means, an input signal applied to said second winding of said first transformer means coupled to said distribution amplifier amplifier means of said first port means input means through said first winding of said first transformer means, said first winding of said second transformer means connected between said first and second input terminals of said distribution amplifier means of said second port means input means, an input signal applied to said second winding of said second transfromer means coupled to said distribution amplifier means of said second port means input means through said first winding of said second transformer means, said first winding of said third transformer means connected between said first and second input terminals of said distribution amplifier means of said third port means input means, an input signal applied to said second winding of said third transformer means coupled to said distribution amplifier means of said third port means input means through said first winding of said third transformer means, and said first winding of said fourth transformer means connected between said first and second input terminals of said distribution amplifier means of said fourth port means input means, an input signal applied to said second winding of said fourth transformer means coupled to said distribution amplifier means of said fourth port means input means through said first winding of said fourth transformer means, a terminating resistor defining an input impedance being connected across said first winding of each said transformer means.

10. The active bridge as claimed in claim 7 wherein each said output means includes summing amplifier means having first and second input terminals and an output terminal.

11. The active bridge as claimed in claim 10 including first, second, third, and fourth transformer means, each of said transformer means having first and second windings, said first winding of said first transformer means is connected between said second input termianl and said output terminal of said summing amplifier means of said first port means output means output means, a signal at said output terminal of said summing amplifier means of said first port means output means is applied to said first winding of said first transformer means and is coupled to said second winding of said first transformer means, said first winding of said second transformer means is connected between said second input terminal and said output terminal of said summing amplifier means of said second port means output means, a signal at said output terminal of said summing amplifier means of said second port means output means is applied to said first winding of said second transformer means and is coupled to said second winding of said second transformer means, said first winding of said third transformer means is connected between said second input terminal and said output terminal of said summing amplifier means of said third port means output means, a signal at said output terminal of said summing amplifier means of said third port means output means is applied to said first winding of said third transformer means and is coupled to said second winding of said third transformer means, said first winding of said fourth transformer means is connected between said second input terminal and said output terminal of said summing amplifier means of said fourth port means output means, a signal at said output terminal of said summing amplifier means of said fourth port means output means is applied to said first winding of said fourth transformer means and is coupled to said second winding of said fourth transformer means.

* * * * *